2,787,622

PROCESS FOR PRODUCING PYRANTHRONE

Maurice H. Fleysher, Buffalo, N. Y., assignor to Allied Chemical & Dye Corporation, New York, N. Y., a corporation of New York No Drawing. Application August 17, 1954, Serial No. 450,515

6 Claims. (Cl. 260—360)

This invention relates to an improved process for preparing 8,16-pyranthrenedione, generally termed pyranthrone.

Pyranthrone, in substantially pure form, is the coloring agent of the commercially available orange vat dyestuff identified as No. 1096 Color Index, 1st edition, and No. 1245 in Schultz Farbstofftabellen, 7th edition. It is also an intermediate for other vat dyestuffs such as the chlorine and bromine derivatives of pyranthrone, identified respectively as Nos. 1097 and 1098 in the Color Index, 1st edition, and AATCC Prototype 381.

It is known to prepare pyranthrone by the condensation of 2,2'-dimethyl-1,1'-dianthraquinonyl to cause the internal elimination of two molecules of water, according to the following equation.

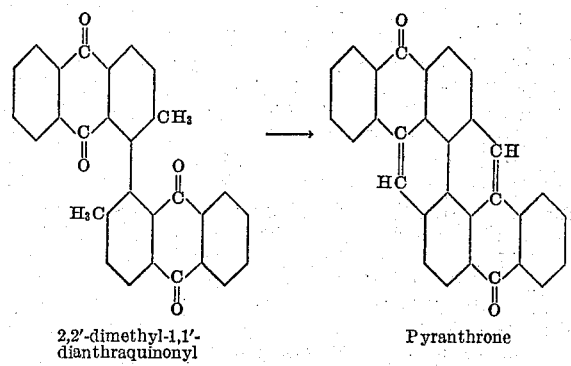

2,2'-dimethyl-1,1'-dianthraquinonyl        Pyranthrone

A well known method of effecting such condensation is by fusion of 2,2'-dimethyl-1,1'-dianthraquinonyl with alcoholic alkali metal hydroxide, especially alcoholic caustic potash. The product of such a fusion is a crude pyranthrone product in its alkali soluble, leuco (i. e. dihydroxy), form, contaminated with substantial quantities of impurities which are in part undesirable color-imparting compounds, and in part organic "non-vattable" materials, the latter being compounds insoluble in the dye vat or soluble compounds having non-tinctorial value. The crude pyranthrone is conventionally recovered by diluting the fusion mixture with water and aerating the resulting alkaline solution to oxidize the leuco pyranthrone to the alkali-insoluble pyranthrone which precipitates as impure, amorphous particles of non-uniform size. For the manufacture of commercial vat dyestuff compositions, the crude pyranthrone product obtained as described, must be subjected to a purifying treatment such as crystallization from a solution in concentrated sulfuric acid, to obtain a uniform, crystalline material from which dyestuff pastes can be satisfactorily prepared and to remove non-vattable materials which would otherwise appear as insoluble contaminants, and vattable non-tinctorial impurities. In such purification or "conditioning" processes, the crude pyranthrone product is dissolved in concentrated sulfuric acid or converted to a sulfate, as in 81% to 86% sulfuric acid, and is then precipitated by controlled dilution of the acid masses with water. Several such "conditionings" with sulfuric acid and reprecipitations by drowning the sulfuric acid solutions are frequently necessary. Even after such treatments, however, the resulting standardized pastes are often non-uniform in physical and dyeing characteristics.

A primary object of the invention is to produce a crude reduced pyranthrone product directly in crystalline form, having such a low content of non-vattable impurities as to render the pyranthrone produced therefrom suitable for immediate use in the preparation of dyestuffs without resort to the customary conditioning or purification processes.

A further object of the invention is to produce a crude pyranthrone product of higher purity than heretofore obtained by prior art processes.

A still further object of the invention is to produce a crude pyranthrone product in which the quality of non-vattable impurities is minimized.

These and other objects are accomplished according to my invention wherein 2,2'-dimethyl-1,1'-dianthraquinonyl is fused with alcoholic potassium hydroxide in the presence of an alkali metal sulfide.

In carrying out the process according to my invention, a fusion mixture of 2,2'-dimethyl-1,1'-dianthraquinonyl, potassium hydroxide and ethyl alcohol is prepared in the usual way, except that a quantity of alkali metal sulfide is added thereto. Fusion is then conveniently carried out in an autoclave, which may be agitated, and the mass is heated, for example, to about 120–125° C. under autogenous pressure which, under the above temperature conditions, may rise to about 50–70 p. s. i. gauge. The mass is then further heated to complete the condensation reaction, i. e. the internal elimination of two molecules of water to produce the reduced pyranthrone product. After the condensation reaction is complete, the mass is cooled, drowned in water, and additionally diluted, if desired. The pyranthrone product thus obtained, according to the process of my invention, unlike the crude leuco pyranthrones obtained in prior art caustic fusion processes, is substantially completely insoluble in the alkaline aqueous mass resulting from dilution of the fusion mass, and precipitates as a brownish-black, fine crystalline product which is believed to be in a more highly reduced state than the dihydroxy leuco product obtained in prior art fusions. The new product of my invention is not readily converted by aeration in the diluted alkaline fusion medium to pyranthrone, due to the presence of the alkali metal sulfide which creates a strong reducing medium which inhibits the oxidation process, and to the presence of alkali metal salts which act to preserve the compound in its insoluble form, and further inhibit oxidation. My new product, however, is readily oxidized in an aqueous medium free of the fusion bath salts, as by aeration or by treatment with the common water soluble oxidizing agents or by a combination of the two expedients. The crystallized precipitate, therefore, is separated from the diluted fusion mass, for example, by filtration, and is slurried in water. It is then oxidized either by subjecting the slurry to aeration or by treatment with a water soluble oxidizing agent such as an alkali metal hypochlorite, sodium nitrobenzene sulfonate, etc. to effect oxidation of the reduced product to pyranthrone.

The reduced crystalline product oxidizes readily on aeration and, under conditions conventionally employed in the aeration of vat dyestuffs, may usually be oxidized substantially completely by blowing with air overnight, e. g. for periods between about 15 and about 18 hours at room temperatures.

If desired, the oxidation may be carried out solely with a water soluble oxidizing agent as by slurrying the reduced pyranthrone product in an aqueous solution of a water-soluble oxidizing agent such as sodium hypochlorite, preferably with agitation, and in such case oxidation may be completed in much shorter periods, for example, in periods as short as about one half hour.

I have found that oxidizing the reduced pyranthrone solely by aeration sometimes produces a pyranthrone which has a somewhat dull shade, even though the oxidation is substantially complete. Accordingly, in a preferred procedure, the oxidation is carried out by first aerating, to partially or substantially complete the oxidation in the dilute slurry; then separating the crystalline pyranthrone and reslurrying it in a hypochlorite solution to "bleach" or brighten the crystals and complete the oxidation. The excess of hypochlorite is neutralized, as with sodium bisulfite, the mass is dewatered and washed. The resulting pyranthrone is thus obtained directly in the form of fine crystals which may be dispersed in and diluted with water to a paste having the desired or commercial standard of solids content, without the necessity for the prior art purification process, and which exhibits characteristics of color content, color value, fluidity, dispersibility in printing gums, jig dyeing, printing, and freedom from non-vattable impurities equal or superior to dyestuff pastes made from pyranthrone prepared by prior art methods employing such purification steps. The pastes as prepared directly may also be used in the preparation of pyranthrone derivatives such as brominated pyranthrone (C. I. 1098) whereas the pyranthrones made by prior art fusion processes require a sulfuric acid purification treatment before they are suitably pure for bromination.

The alkali metal sulfide used in the fusion step is substantially anhydrous, conveniently being added in flake or "chip" form containing about 40–60% alkali metal sulfide. All of the alkali metal sulfides are suitable for use in the process of my invention including sodium, potassium, and lithium sulfides, sodium sulfide being preferred. The amount of alkali metal sulfide used is not unduly critical, but should preferably be at least about 5% by weight of alkali metal sulfide (100% basis), based on the weight of the 2,2'-dimethyl-1,1'-dianthraquinonyl charged to the fusion reaction, preferably between about 5% and about 30% on the above basis, although greater quantities do no harm.

If potassium sulfide is the alkali metal sulfide used, it need not be added to the fusion mass as such, but it may be formed in situ by adding the requisite amount of sulfur to the fusion charge. The sulfur then reacts with the potassium hydroxide at the fusion temperature to form potassium sulfide which exerts its beneficial action on the resulting product.

The striking benefits derivable from my invention are clearly brought out by processing the crude fusion product, without prior purification, to a vattable dyestuff paste at a standard commercial concentration, and comparing the yield and quality of such paste with those of pastes prepared from pyranthrone products made from the same dimethyldianthraquinonyl starting material, by prior art processes, without the use of an alkali metal sulfide; and which have been purified by crystallization from sulfuric acid. In such operations "crude" products prepared according to the process of my invention show higher purity of pyranthrone in the crudes, purity in many cases being greatly in excess of purity obtained according to prior art processes. Using sodium sulfide as the alkali metal sulfide, not only is the quantity of non-vattable components reduced, but the yield of pyranthrone per se is increased.

The following specific examples further illustrate my invention. Parts are by weight except as otherwise noted.

*Example 1*

A mixture of 2,606 parts denatured ethyl alcohol 2B, 523 parts flaked potassium hydroxide, 849 parts 2,2'-dimethyl-1,1'-dianthraquinonyl and 83 parts of commercial flaked sodium sulfide containing 52 parts of sodium sulfide (about 6% based on the dimethyldianthraquinonyl), was agitated in a jacketed autoclave for about one half hour, then heated over a period of about 2 hours to about 125° C. and agitated at that temperature for 16 hours, the pressure in the autoclave during the period at the upper temperature being 58 to 60 p. s. i. g. The batch was then cooled to room temperature to permit release of pressure and opening of the autoclave. 66 parts of trisodium phosphate (as a water softening agent) were added, the batch was diluted in the kettle with about 2,000 parts of water and was then drowned in about 4,000 parts of cold water. The whole mass was finally diluted with additional cold water to provide a total of 10,000 parts of water.

The main fusion product, a blackish, insoluble precipitate of a reduced form of pyranthrone, was separated by filtration from the diluted aqueous mass. The filter cake was washed lightly with cold water to displace adhering mother liquor. The washed reduction product was stirred into about 6,000 parts cold water and formed a slurry which was aerated for about 6 hours, then diluted to a volume equal to about 15,000 parts of water and aerated further for about 16 hours to complete oxidation of the reduced compound to pyranthrone. The aqueous mass was then filtered to separate a filter cake of fine crystals of pyranthrone. The cake was diluted to an aqueous slurry of about 2 parts solids per 100 parts water volume and the crystals were "bleached" by adding sufficient 10% aqueous sodium hypochlorite to the agitated slurry at about 60° C. to about 70° C. to leave a slight detectable amount of the hypochlorite in the aqueous mass about 3 hours after the first addition of the hypochlorite. The excess hypochlorite was then neutralized by addition of a small quantity of sodium bisulfite and the slurry was filtered. The filter cake was washed with water until mother liquor was completely displaced, thereafter it was dispersed in, and diluted with, water to a paste at the commercial standard of solids content. The resulting paste was tested in comparison with a commercial standard dyestuff paste made from purified acid-pasted pyranthrone prepared by a prior art method in which no sulfide was used in the fusion and the product was purified by crystallization from sulfuric acid, with respect to color content, fluidity, color value, dispersibility in printing gums, pad and jig dyeing, printing and freedom from non-vattable impurities, and was found to be at least equal to, and, in the case of printing and freedom from non-vattable impurities, was markedly superior to the standard material. Yield of standard paste from the pyranthrone of the example was 394 parts per 100 parts of dimethyldianthraquinonyl fused, as compared to 346 parts obtained as a yield in the above indicated prior art process.

*Example 2*

A mixture of 600 parts of denatured ethyl alcohol 2B, 122 parts caustic potash flakes, 200 parts of 2,2'-dimethyl-1,1'-dianthaquinonyl and 35 parts of potassium sulfide containing 45% K₂S (the balance being chiefly sulfate and thiosulfate), was heated in an autoclave for 2 hours at 124 to 126° C. (55 to 70 p. s. i. g.) and agitated at that temperature for about 16 hours. The charge was then cooled, diluted with about three times its volume of water, filtered, and the filter cake of reduced pyranthrone product was washed with cold water. The filter cake thus obtained, was suspended in about 1,400 parts of water and aerated for 16 hours, which brought about substantially complete oxidation of the reduced product to pyranthrone having however a somewhat dull shade. Thereafter, the slurry was diluted with about 2½ times its volume of water, filtered, and the filter cake of pyranthrone was washed with cold water. The filter cake was slurried in water and the dull pyranthrone was "bleached," in the manner described in Example 1, with aqueous sodium hypochlorite to finish off the oxidation. The bleached pyranthrone was recovered as a filter cake, washed with water until alkali free, and dispersed and diluted in the usual manner to a water paste at the commercial standard of solids content. The paste was tested for shade, color value on yarn, printing value and non-vattable content in comparison with a paste made from wet pyranthrone obtained by purifying with sulfuric acid the crude pyranthrone made from the same dimethyldianthraquinonyl by the method of the prior art in which no sulfide was employed in the fusion mass. As a result of this test, it was found that although the product of the example had received no purification treatment, the color values of the two pastes were alike when judged by yarn dyeings. According to printing tests, the printing value of the paste from the $K_2S$ method was about 18% greater than that of the paste made by the prior art method; the yellow shades of dyeings and printings of the two pastes were about equal; and the non-vattable content per unit weight of solids in the pastes were about equal.

The results of the above tests indicate that the pyranthrone obtained by aerating the product of the fusion of dimethyldianthraquinonyl in the presence of potassium sulfide, does not contain impurities which necessitate tedious and costly purifications, although for commercial dispersions as vat dye pastes, the physical appearance of such pyranthrone is usually improved by hypochlorite bleaching.

*Example 3*

The dry pyranthrone recovered from the $Na_2S$-containing fusion mass of Example 1, was converted, without purification, to the dibrom-pyranthrone dyestuff (Color Index 1098) paste in conventional manner. The dibrom pyranthrone product thus obtained compared equally in all respects to the product made by the prior art processes from pyranthrone which had been prepared without the use of sulfide and subjected to the customary sulfuric acid purification treatment.

While the above describes the preferred embodiments of my invention, it will be understood that departures may be made therefrom within the scope of the specification and claims.

I claim:

1. In a process for the condensation of 2,2'-dimethyl-1,1'-dianthraquinonyl to a reduction product of pyranthrone by fusion with alcoholic potassium hydroxide, the improvement which comprises carrying out the condensation in the presence of at least about 5% by weight of an alkali metal sulfide based on the weight of the 2,2'-dimethyl-1,1'-dianthraquinonyl present.

2. The process according to claim 1 wherein the alkali metal sulfide is sodium sulfide.

3. The process according to claim 1 wherein the alkali metal sulfide is present in an amount between about 5% and about 30% by weight based on the weight of the 2,2'-dimethyl-1,1'-dianthraquinonyl present.

4. A process for preparing a reduced product of pyranthrone which comprises preparing a fusion mixture of ethyl alcohol, potassium hydroxide, 2,2'-dimethyl-1,1'-dianthraquinonyl, and a small quantity of sulfur sufficient to produce, upon reaction with potassium hydroxide in the fusion mixture, at least about 5% by weight of potassium sulfide based on the 2,2'-dimethyl-1,1'-dianthraquinonyl in the mixture, confining the mixture, and heating it under autogenous pressure until condensation of the 2,2'-dimethyl-1,1'-dianthraquinonyl to a reduced product of pyranthrone has been effected.

5. The process for preparing a crystalline pyranthrone product of high purity which comprises subjecting 2,2'-dimethyl-1,1'-dianthraquinonyl to alcoholic caustic fusion in the presence of at least about 5% of an alkali metal sulfide whereby a water insoluble, crystalline reduced pyranthrone product is produced, diluting the fusion mass with water, separating the insoluble reduced pyranthrone product, and oxidizing the reduced pyranthrone product to pyranthrone.

6. The process according to claim 5 wherein the oxidation is carried out by aeration in an aqueous medium.

References Cited in the file of this patent

UNITED STATES PATENTS

| | | |
|---|---|---|
| 555,904 | Laubman | Mar. 3, 1896 |
| 1,440,833 | Kalischer et al. | Jan. 2, 1923 |
| 1,894,790 | Rintelman | Jan. 17, 1933 |
| 2,321,787 | Zerweck et al. | June 15, 1943 |
| 2,459,366 | Cullinan | Jan. 18, 1949 |

FOREIGN PATENTS

| | | |
|---|---|---|
| 10,677 | Great Britain | Nov. 23, 1905 |

OTHER REFERENCES

Houben: Das Anthracen und die Anthrachinon; Goerg Thieme, Leipzig (1929); page 749.

Hiyana et al.: Chemical Abstracts, vol. 47, p. 4612d (1952).